March 27, 1962  L. I. KRAMER  3,027,021
DEMAND FEEDING APPARATUS
Filed Aug. 15, 1958  3 Sheets-Sheet 1
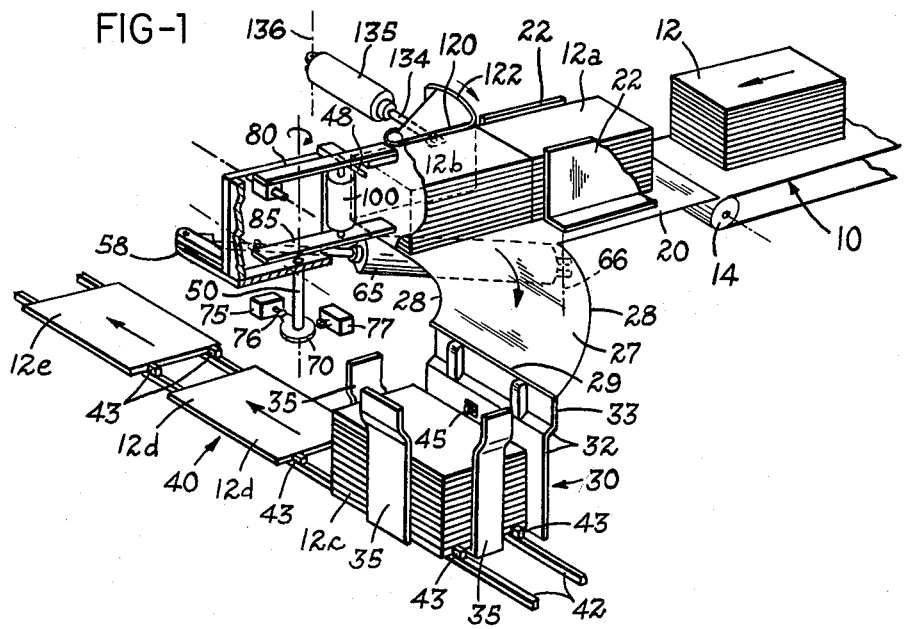
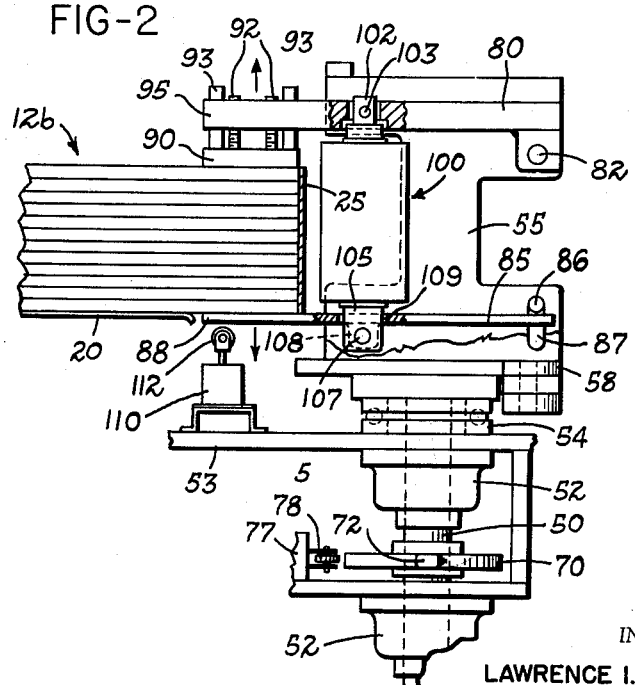
INVENTOR.
LAWRENCE I. KRAMER
BY
*Marechal, Biebel, French & Bugg*
ATTORNEYS March 27, 1962
L. I. KRAMER
3,027,021
DEMAND FEEDING APPARATUS
Filed Aug. 15, 1958
3 Sheets-Sheet 2
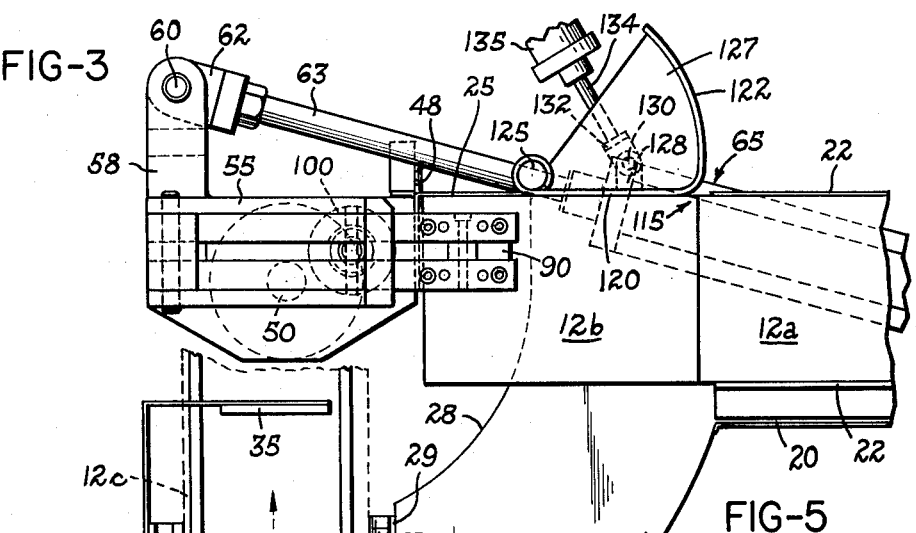
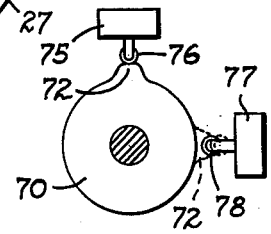
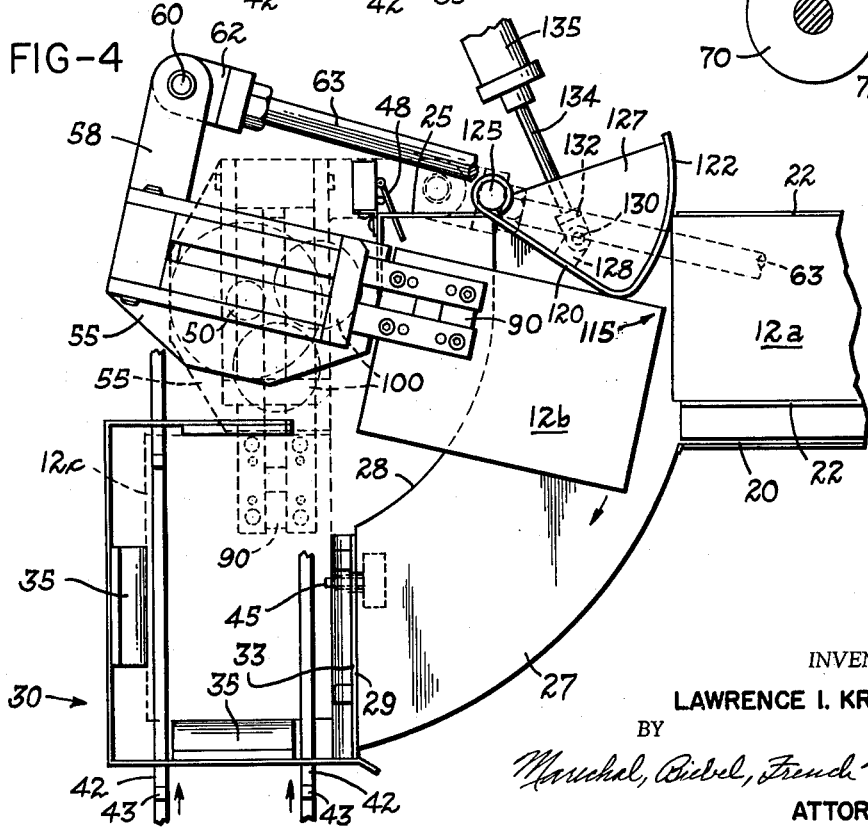
INVENTOR.
LAWRENCE I. KRAMER
BY
*Marechal, Biebel, French & Bugg*
ATTORNEYS

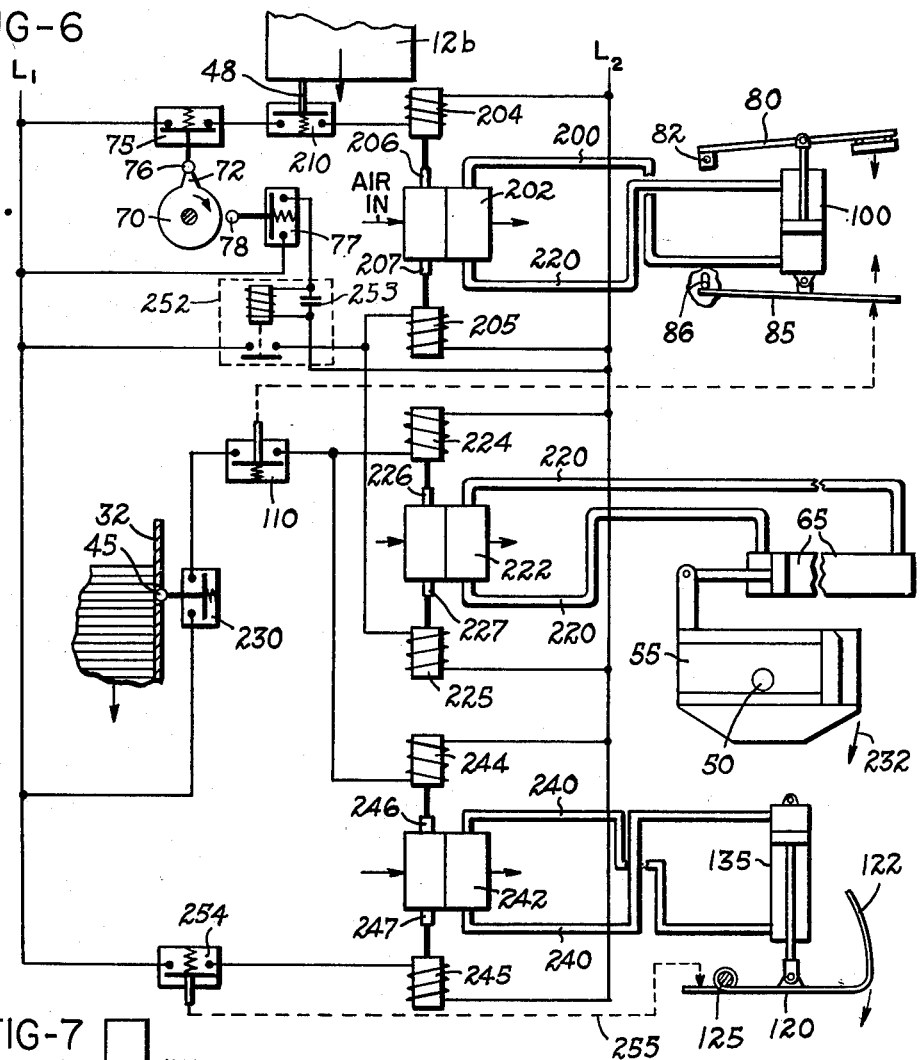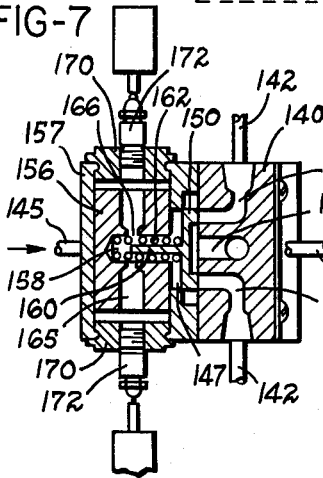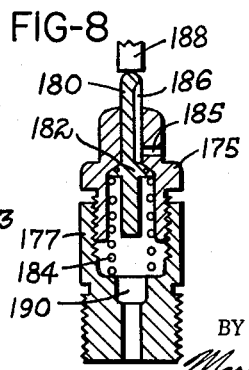

United States Patent Office

3,027,021
Patented Mar. 27, 1962

3,027,021
DEMAND FEEDING APPARATUS
Lawrence I. Kramer, Dayton, Ohio, assignor to McCall Corporation, Dayton, Ohio, a corporation of Delaware
Filed Aug. 15, 1958, Ser. No. 755,263
9 Claims. (Cl. 214—8.5)

This invention relates to apparatus for feeding material grouped in piles, such as a pile of books, magazines, or the like, into a hopper from which the material is distributed, for example by removing single books from the bottom of the hopper.

A typical application of the present invention is in connection with the feeding of books, magazines, or the like, continually in succession to a machine for wrapping, labeling, or otherwise acting upon the books individually, from the output of a trimmer where the books have been cut to proper size and prepared for the labeling or other operation. In the trimming operation the most economical manner of handling the books is in piles, for example of approximately twelve books per pile, such that a single stroke of the trimming knife mechanism can be effective to trim a number of the books to desired dimensions. The trimming operation therefore, although operating at a relatively high production rate, may have its output directed to a conveyor which will carry successive piles of trimmed books at relatively slow speed.

The books supported on this conveyor are thus prepared for the operations of the following machine as above described, which wraps or labels, etc., the books individually, and this latter machine is capable of continuous operation at a relatively high speed, substantially in excess of the speed of the aforementioned conveyor. The present invention therefore is directed to apparatus for transferring the piles of trimmed books or like material from the relatively slow moving conveyor into the feed hopper of the wrapping or labeling machine, thus eliminating an operation previously performed manually, and providing a constant supply to the wrapping machine which enables it to operate continuously at relatively high speed, since a number of individual books, in a pile, are placed in the labeling machine feed hopper at each transfer.

The primary object of this invention, therefore, is to provide novel apparatus for demand feeding to the feed hopper of a relatively high speed machine, a pile of books or the like supplied in a prepared pile from the output of a previous operation.

A further object of the invention is to provide such apparatus wherein successive piles of material are moved to an index position, wherein a transfer clamp is provided to grasp the index pile and move it to the top of a stack of material placed in a feed hopper, and wherein controls are provided for governing the movements of the transfer clamp in accordance with the lowering of the top level of the stack in the hopper below a predetermined limit and the positioning of a further pile at the index position.

Another object of the invention is to provide such a machine with controls for assuring that the transfer clamp will not be actuated unless a pile is properly supported in the index position, and that the transfer clamp is properly aligned with the index position when the jaws of the clamp are closed to grasp the pile to be transferred.

An additional object of the invention is to provide controls for the transfer clamp which assure that the clamp is halted in position at the feed hopper prior to release of the clamp jaws from the pile, whereby deceleration of the pile is accomplished under control of the transfer clamp and the pile is not thrown into the hopper.

Another object of this invention is to provide such apparatus including controls which return the transfer clamp to the index position once a pile has been deposited in the feed hopper.

Other objects and advantages of the invention will be apparent from the following description, the accompanying drawings and the appended claims.

In the drawings—

FIG. 1 is a somewhat schematic perspective view of apparatus constructed in accordance with the invention;

FIG. 2 is a side elevational view on an enlarged scale of a portion of the transfer clamp mechanism shown in FIG. 1;

FIG. 3 is a top plan view of the transfer clamp mechanism and associated operating parts;

FIG. 4 is a view similar to FIG. 3 showing the transfer clamp in an intermediate position in full lines, and showing the clamp in its delivery position in dotted lines;

FIG. 5 is a detail view of the switch operating cam which rotates with the transfer clamp;

FIG. 6 is a combined wiring and pneumatic diagram illustrating a suitable control system for the apparatus;

FIG. 7 is a somewhat schematic sectional view on an enlarged scale through a suitable electro-pneumatic transducer and servo control which may be employed in the apparatus; and FIG. 8 is an enlarged partial section through a solenoid operated sensing valve used in the device shown in FIG. 7.

Referring to the drawings, which illustrate a preferred embodiment of the present invention, FIG. 1 shows, in a somewhat schematic manner, the overall construction and arrangement of the demand feeding apparatus. For purposes of explanation reference is made to machinery used in preparing bound books for individual wrapping or mailing, although it should be understood that the invention is not necessarily limited to use with such machinery.

Thus, in FIG. 1 a conveyor 10 transports piles of bound books or other material in succession to the discharge end thereof, which is defined by the roller 14. The conveyor may be operated continuously, or intermittently, and incorporates a suitable drive (not shown). The books in the pile 12 are bound and trimmed, and ready to be wrapped for distribution, for example for mailing to subscribers. At the discharge end of the conveyor a receiving plate 20 is aligned with the surface of conveyor 10 and includes upstanding guide walls 22 which receive an oncoming pile of books, indicated at 12a, and center these books to be pushed by following piles of books, i.e., pile 12 in the drawing, to an index position in which the pile 12b is illustrated. This position is defined by an upstanding generally L-shaped wall 25 (FIGS. 2 and 3) supported beyond the end of the receiving plate 20.

The receiving plate includes a lateral extension 27 which projects to one side and beyond the end of the plate at the index position, such that the opposite sides of extension 27 are defined by curved edges 28 and a discharge edge 29 which is located in a plane beyond the transversely extending portion of the index wall 25. This relation is particularly apparent in FIGS. 3 and 4.

At the discharge edge of extension plate 27 there is a feed hopper 30 defined by an upstanding wall 32 having an offset upper end 33, together with three upwardly extending guide arms 35 which cooperate to define the four sides of the hopper. The bottom of the hopper opens over a feeding conveyor 40 for a wrapping machine which may, for example, secure a covering wrap around the individual books, and also may be adapted to place address labels or the like on the individual books. Details of this machine are not illustrated since they form no part of the present invention.

The feeding conveyor 40 may include spaced parallel chains or the like, illustrated schematically at 42, having upstanding lugs 43 thereon at spaced intervals along their length to engage a single book or similar piece of material at the bottom of hopper 30, and thus to feed the books 12d and 12e individually in succession, as illustrated in FIG. 1. The stack of books in hopper 30 thus has a receding top level, as the books are removed individually from the bottom of the hopper, which eventually will be lowered past a switch actuator 45 defining the level at which the stack in the hopper has receded sufficiently to accept a further pile from the index position. The switch actuator 45 thus constitutes a means responsive to movement of the top of the stacked material below a predetermined limit for providing a signal to initiate transfer of a further pile into the hopper.

Referring to FIGS. 3 and 4, a switch operator arm 48 extends through an aperture in the corner of index wall 25, and is thus in position to be moved by an oncoming pile of books fed to the index position. This pile will be centered, as previously mentioned, by the guiding walls 22, and thus as the switch arm 48 is moved to the position shown in FIG. 3, this will provide a signal indicating that a further pile of books is in readiness for transfer from the index position. When a pile is not properly positioned against the index wall 25, then arm 48 will be biased forward, as shown in FIG. 4.

The mechanism for transferring piles from the index position to the hopper includes a transfer clamp which is mounted upon a vertical rotatable shaft 50 for movement between index wall 25 and hopper 30. The shaft is supported by bearings 52 (FIG. 2) carried on parts of the machine framework 53, and extends through a thrust bearing 54 which in turn supports the framework 55 of the clamp for rotation with the shaft 50. A suitable drive connection (not shown), is provided between shaft 50 and the framework 55 to assure conjoint rotation thereof. A slotted drive arm 58 extends from one side of framework 55 and receives a pivot pin 60 which passes through the fitting 62 secured to the end of piston rod 63, forming the drive connection to a double-acting piston-cylinder pneumatic motor 65 mounted beneath the receiving plate 20, as by a suitable mounting 66 illustrated schematically in FIG. 1 attached to the end of the cylinder. By adjusting the stroke of motor 65, in any suitable manner, the clamp framework 55 may be rotated between its index position, shown in full lines in FIG. 3, and its delivery position shown in dotted lines in FIG. 4.

A cam 70 having a single lobe 72 is secured to the lower end of shaft 50, and provides an indication of the position of the clamp framework. Thus, a first switch 75 has its operator 76 supported to be engaged by lobe 72 when the clamp framework is in its index position, providing a signal to that effect. In appropriate position spaced around the periphery of cam 70 is a further switch 77 having its operator 78 supported to be engaged by lobe 72 when the clamp framework is in its delivery position, and providing a signal accordingly.

The clamp framework supports an upper arm 80 pivoted upon a pin 82 which is suitably journaled in framework 55, and a lower arm 85 is fixed to a cross pin 86, the ends of which are received in vertically elongated slots 87 through the side of clamp framework 55. The forward end of arm 85 projects beneath the index wall 25 and adjacent to the edge of the delivery plate 20, providing a lower clamp jaw 88 which may engage the bottom of the pile of material in the index position. An upper jaw member 90 is adjustably suspended, by means of bolts 92 and guide pins 93 from the forward end 95 of upper arm 80. The upper jaw 90 is engageable with the top of the pile, and the adjustment thereof provides for proper clearance when the jaws are opened prior to engagement with a pile at the index position.

The jaws are operated by a double-acting piston-cylinder pneumatic motor 100 having the piston rod 102 thereof connected by pin 103 to the upper clamp arm 80, while the mounting bracket 105 for the cylinder part is pivotally connected by a pin 107 to arms 108 depending from the sides of opening 109 through the lower arm 85. This motor thus controls the opening and closing of jaws 88 and 90 during a transferring and feeding operation. Assuming that the jaws are closed, as shown in FIG. 2, when motor 100 expands the lower jaw will drop rapidly, substantially vertically by reason of the slotted mounting of cross pin 86 and because it will bottom solidly against a surface of the clamp framework at right angles to its vertical movement, and the jaw will free itself rapidly from a clamped pile.

A switch 110 is mounted on framework 53 below arm 85, and includes an operator 112 which is supported beneath the lower clamp jaw 88 to be engaged therewith when the jaw is dropped to its open position, below the level of plate 20. This switch therefore provides a signal indicating whether or not the clamp jaws are closed.

As the piles of books pass from conveyor 10 onto the receiving plate 20, they are retarded in their forward motion and engage each other in successive relation, as for example shown in connection with the piles 12a and 12b. Thus, the following piles may be relied upon to feed those on the receiving plate 20 toward the indexing wall 25. As the clamp grasps the pile and begins to rotate in a direction to deliver the pile to hopper 30, the trailing corner, indicated by reference numeral 115 of the moved pile in FIG. 4, moves through an arc which extends across a plane passing through the abutting faces of the indexed pile 12b and following pile 12a. This will be apparent from comparison of the relative positions of these piles in FIGS. 3 and 4.

Since the clamp jaws are engaging only the forward portion of the pile, and since it is undesirable to transmit force through the pile 12b sufficient to move the pile 12a backward, a pusher member is provided for the purpose of accelerating the pile 12b during the delivery stroke and also for engaging and moving backwardly the following pile 12a. The pusher member is provided by a moving wall 120 having a curved continuation or wall 122 extending from one edge thereof, preferably as an integral part, and is mounted upon a shaft 125 adjacent the forward edge of the index wall 25. A gusset plate 127 may be provided between walls 120 and 122 to increase the rigidity of this member.

The rearward side of wall 120 includes a bracket 128 pivotally connected by pin 130 to a fitting 132 on the end of the piston rod 134. This piston rod extends from a double-acting piston-cylinder pneumatic motor 135 which is suitably anchored at its other end, as shown schematically at 136 in FIG. 1. Actuation of this motor will, therefore, cause the pusher member to rotate approximately to the position shown in FIG. 4, assisting the transfer clamp in accelerating the pile 12b, and at the same time pushing the pile 12a rearwardly a distance sufficient to clear the trailing corner 115 of pile 12b as it swings through the delivery stroke.

FIGS. 7 and 8 illustrate, in somewhat diagrammatic fashion, suitable transducers and servo motors for controlling the operation of the three pneumatic cylinders which operate the apparatus. It should be understood that details of these items form no part of the present invention since they are readily obtainable as commercial units, and the following description is merely for the purpose of explaining suitable means to control the pneumatic cylinders. Thus, referring to FIG. 7 the servo motor control includes a body 140 having opposite outlets to control lines 142 which may be connected to opposite ends of a double-acting pneumatic cylinder, as these motors are commonly designated.

Pressure air is supplied from inlet line 145 to the chamber 147 within which is mounted a shuttle valve 150, this valve providing the servo control. A central chamber 152 is connected to exhaust through line 153, and passages 154 and 155 extend on opposite sides thereof, being alternately connected to chambers 147 and 152 in accordance with the movement of shuttle valve 150. Movement of this valve is effected by a piston 156 which is mounted for sliding movement in a cylinder 157. The piston has a transverse passage 158 into which extends a stem 160 from the shuttle valve 150. Preferably this stem is surrounded by a spring 162 which serves to seat the shuttle valve. Passages 165 extend from the transverse passage 158 through opposite ends of piston 156, and communicate with passage 158 through identical orifices 166. Cylinder heads 170 are fitted into opposite ends of cylinder 157 and each include sensing valves 172.

Details of one such valve are shown in FIG. 8, wherein the main body 175 of the valve is threaded into a fitting 177 which in turn can be threaded into the cylinder head 170. A valve stem 180 is slidably received in body 175 and includes an enlarged valve head 182 which is normally biased into the seated position, as shown, by spring 184. The nose portion of body 175 includes an exhaust passage 185 communicating with a longitudinal slot 186 in the stem 180, and thus if the valve stem is pressed, as by the armature 188 of a solenoid, the head 182 will be unseated and the pressure in the interior passage 190 of the sensing valve, communicating with an appropriate end of the cylinder 157, will be considerably reduced.

The resulting operation is such that a pulse to a controlling solenoid will unseat an appropriate sensing valve momentarily and shift the shuttle or servo valve 150 accordingly, at which position it will remain until the pressure is unbalanced in the opposite direction by opening the sensing valve on the opposite side.

Referring to FIG. 6, the electrical and pneumatic controls for the apparatus are shown schematically, and lines $L_1$ and $L_2$ represent a suitable source of electricity. The clamp cylinder 100 is connected through lines 200 to a servo control unit 202 of the type just described, and solenoids 204 and 205 are connected to operate the two sensing stems 206 and 207, respectively, of this unit. Solenoid 204 is connected in a series circuit including switch 75, which is normally biased open, but which is closed by lobe 72 of cam 70 when the transfer clamp is in the index position, the condition shown in FIG. 6. This circuit also includes a switch 210, normally biased open, and connected to the sensing arm 48 at the index wall 25, to be closed when a pile of books reaches the index position as shown in FIG. 3. Thus, to energize relay 204 two conditions must be satisfied; the clamp framework must be in readiness at the index position, and a pile of books must have reached the index position contacting the L-shaped wall 25. When these two conditions are satisfied then relay 204 will be energized to pulse the sensing valve 206 and piston 100 will be operated to close the clamp jaws.

The pneumatic cylinder 65 is connected through its control lines 220 to its servo control unit 222. A solenoid 224 and a solenoid 225 are mounted to operate the sensing stems 226 and 227, respectively, of this unit. Solenoid 224 is connected in series with a switch 230, normally biased closed, and operated by the member 45 which establishes the control level of the top of a stack of books in hopper 30. When the top of the stack falls below this level switch 230 will close. Switch 110, also normally biased closed, is also in this circuit, and thus will close to complete the circuit when the lower clamp jaw 88 is raised. Therefore, solenoid 224 will be energized provided the demand for a further pile of books is registered by closing of switch 230, and provided the transfer clamp has closed to engage the pile at the index position. This will cause the servo control unit 222 to operate pneumatic cylinder 65 in a direction to rotate clamp framework 55 as indicated by the arrow 232, initiating the delivery stroke.

The pneumatic cylinder 135 is connected through lines 240 to its servo control device 242 which will thus control the motion of the pusher member 120. Solenoids 244 and 245 are supported to operate the sensing units 246 and 247, respectively, of servo unit 242, and solenoid 244 is connected in parallel with solenoid 224. Therefore, these solenoids will be energized together, and the motion of cylinder 135 will be initiated at the same time as cylinder 65 commences its delivery stroke. The acceleration of these two motors can be correlated by proper relationship of the size of the connecting conduits 220 and 240, as well as the pneumatic pressures employed, as is well known in the art of pneumatic controls.

When the transfer clamp reaches its delivery station over the hopper 30, cam lobe 72 will engage the operator 78 of switch 77, which is normally biased open. Closing of this switch actuates a conventional delay circuit 250, which may for example include a time delay relay 252 having a condenser 253 of suitable capacity connected in parallel with the coil winding thereof to provide a delay in actuation of relay 252 after switch 77 is closed. Closing of the relay contacts energizes solenoid 205 to reverse servo unit 202, with resultant opening of the clamp jaws by cylinder 100. Solenoid 225 is connected in parallel with solenoid 205, and therefore will be energized at the same time to reverse the servo unit 222, causing cylinder 65 to reverse and move the clamp framework back to the index position.

The operation of the pusher member occurs during the initial portion of the transfer cycle only, and thus this member is moved forward sufficient to assist in accelerating the transferring pile, and to move back the next oncoming pile, and then this member is rapidly withdrawn. Thus, a switch 254, normally biased open, is connected to control solenoid 245, and this switch is closed by movement of the pusher member 120 to a predetermined position, approximately as shown in FIG. 4. This operating connection to switch 254 is shown schematically at 255 in FIG. 6, and may be accomplished by sensing either the rotative movement of the pusher member to a desired limit, or by sensing the motion of the driving piston rod 134 therefor. Once switch 254 is closed any suitable provision may be made for an immediate return stroke of the pusher member. For example, the piston 156 in the servo control unit 242 may be normally biased, when conditions are equalized, by having solenoids 244 and 245 in the same condition (both energized or both de-energized), to direct pressure air to motor 135 for retraction of pusher 120. This biasing condition may be obtained by a light biasing spring acting on the servo piston of control unit 242, or by appropriate relative sizing of the orifices 166 to obtain the desired unbalance on the servo piston in unit 242 when both the solenoid controlled valves are open. This causes the pusher member to retract immediately, and permits the oncoming pile 12a to move into the index position while the remainder of the transfer cycle is completed, and the transfer clamp returns to its index position. The entire cycle will then be completed, with its further initiation depending upon return of the transfer clamp to its index position, closing switch 75, and movement of the next pile into the index position, closing switch 210.

The apparatus provided by this invention thus will feed a pile of books or the like on demand to the feeding hopper of a relatively high speed machine capable of operating on the books individually. The piles of books fed to the apparatus are aligned or indexed in proper position, securely clamped to retain the pile in fixed relation, and transferred rapidly to the hopper through an angular movement of 90°. At the end of the transfer stroke the clamp member is stopped momentarily before it is released and its motion reversed to free the pile of books and permit the pile to fall into the hopper. Thus, the pile is effectively stopped over the hopper and the clamp opened and moved rapidly back toward the index position, with little disturbance of the pile which is then free to fall into the hopper. This transfer movement facilitates proper placement of the machinery between which it operates.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus transferring successively arranged piles of material into stacked relation in a hopper, comprising conveyor means having a discharge end and supported to receive piles of material in successive relation along the length thereof, stop means located in predetermined relation to said discharge end for receiving the piles individually, means defining a hopper dimensioned to receive a single stack of the material including apparatus for distributing the material from the bottom thereof to maintain the top level of the stack in said hopper within predetermined limits, transfer clamp means capable of engaging a single pile of material, means mounting said clamp means for selective movement between said stop means and said hopper, and controls responsive to the location of the top level of the stack in said hopper for producing cyclic movement of said clamp means to transfer a pile of material from said stop means to said hopper.

2. Apparatus for demand feeding material into a hopper from the bottom of which the material is distributed, comprising conveyor means having a discharge end and supported to receive piles of the material in successive relation along the length thereof, means at said discharge end for guiding successive piles of material into said apparatus, index stop means associated with said guiding means for aligning the piles each successively in predetermined position, means defining a hopper in spaced relation to said stop means, transfer clamp means having jaws arranged to engage a single pile of material at said stop means, means mounting said clamp means for selective movement between said stop means and said hopper to effect transfer of a pile to said hopper, and control means operatively connected to said clamp means for producing cyclic operation thereof between said stop means and said hopper to transfer successive piles of material into said hopper in stacked relation responsive to movement of the top level of the stack in said hopper beyond a predetermined limit.

3. Apparatus of the character described comprising index stop means for positioning a pile of material, guide means aligned with said stop means for directing piles of material in succession thereto, a hopper having a receiving level substantially coplanar with the bottom of a pile positioned in said stop means, said hopper being spaced laterally of said stop means, transfer clamp means engageable with a pile of material indexed at said stop means and movable to carry the pile to said hopper, control means connected to operate said transfer clamp means including sensing means responsive to positioning of a pile at said index stop means and to alignment of said transfer clamp means with said stop means for engaging said transfer means with a pile, means responsive to movement of material in said hopper beyond said receiving level and to engagement of said transfer clamp means with a pile of material for producing movement of the pile to said hopper, and means responsive to delivery of a pile to said hopper for repositioning said transfer clamp means at said stop means.

4. Apparatus of the character described comprising index stop means for positioning a pile of material, guide means aligned with said stop means for directing piles of material thereto, conveyor means discharging into said guide means for receiving piles of material in successive relation along the length thereof and feeding said piles singly to said guide means, a hopper having a receiving level substantially coplanar with the bottom of a pile positioned in said stop means, said hopper being spaced laterally of said stop means, transfer clamp means including jaws engageable with a pile of material indexed at said stop means, means for moving said jaws to convey a pile of material to said hopper, and a control connected to operate said clamp means including sensing means responsive to positioning of a pile at said index stop means and to alignment of said jaws with said stop means for engaging said jaws with the pile, means responsive to movement of the top level of stacked material in said hopper a predetermined distance below said receiving level and to engagement of said jaws with a pile for producing movement of the pile to said hopper, and means responsive to delivery of a pile to said hopper for releasing said jaws and repositioning said transfer means at said stop means.

5. Apparatus for receiving successively arranged piles of books or like material and feeding the books singly and continuously, comprising conveyor means having a discharge end and arranged to convey successive piles of books toward said discharge end, index means aligned with said discharge end for receiving the piles of books individually, means defining a hopper dimensioned to hold the books stacked singly therein, apparatus for distributing the books one at a time from the bottom of said hopper, transfer clamp means including jaws selectively operable to engage a single pile of books, means mounting said clamp means for selective movement between said index means and said hopper, and controls responsive to the lowering of the stack in said hopper beyond a predetermined limit for producing cyclic operation of said clamp means to transfer a pile of material from said index means to said hopper.

6. Apparatus for demand feeding material into a hopper from the bottom of which the material is distributed, comprising means for guiding successive piles of material into said apparatus, index stop means associated with said guiding means for aligning the piles in predetermined position, means defining a hopper in spaced relation to said stop means, transfer means engageable with a single pile of material, means mounting said transfer means for selective movement between said stop means and said hopper, a pusher element adjacent said stop means on the opposite side thereof from said hopper, means supporting said pusher element for movement toward said hopper, control means operatively connected to said transfer means for producing cyclic movement thereof between said stop means and said hopper, and means connected to said control means for moving said pusher element to act against a pile being transferred by said transfer means during an initial portion of each transferring cycle thereof.

7. Apparatus of the character described comprising the combination of means for guiding successive piles of books or the like into said apparatus, index means aligned with said guiding means for supporting a single pile in predetermined position, means defining a hopper in spaced relation to said index means, means operatively associated with said hopper for removing books singly in succession from the bottom of a stack placed in said hopper, transfer means engageable with a single pile of books at said index means, means mounting said transfer means for selective movement between said index means and said hopper, control means operatively connected to said transfer means for producing cyclic movement thereof between said index means and said hopper including a device responsive to movement of the top of a stack in said hopper beyond a predetermined limit to initiate operation of a transfer cycle, a pusher element mounted adjacent said index means, means for moving said pusher element against a pile engaged by said transfer means and for engaging the succeeding pile in said guiding means to assist each transferring operation during the acceleration portion thereof and to provide clearance between the transferred pile and the succeeding pile.

8. Apparatus of the character described comprising index stop means for positioning a pile of material, guide means aligned with said stop means for directing piles of material in succession thereto, a hopper having a receiving level substantially coplanar with the bottom of a pile positioned in said stop means, said hopper being spaced laterally of said stop means, transfer clamp means engageable with a pile of material indexed at said stop means and movable to convey the pile to said hopper, a pusher element adjacent said guide means on the opposite side of said stop means from said hopper, means mounting said pusher element for movement against the side of a pile engaged with said transfer clamp means to assist said clamp means in accelerating said pile during initiation of a transfer movement, means on said pusher element engageable with the following pile in said guide means to move said following pile away from said stop means a distance sufficient to provide clearance for movement of the pile engaged by said clamp means, control means connected to operate said clamp means including sensing means responsive to positioning of a pile at said index stop means and to alignment of said clamp means with said stop means for engaging said clamp means with a pile, means responsive to movement of material in said hopper a predetermined distance beyond said receiving level and to engagement of said clamp means with a pile of material for producing movement of the pile to said hopper, and means responsive to transfer movement of said clamp means for initiating operation of said pusher element and for withdrawing said pusher element before completion of the transferring operation of said clamp means.

9. Apparatus for receiving successively arranged piles of books or like material and feeding the books singly and continuously, comprising conveyor means having a discharge end and arranged to convey successive piles of books toward said discharge end, index means aligned with said discharge end for receiving the piles of books individually, means defining a hopper dimensioned to hold the books stacked singly therein, means supporting said hopper extending laterally of said index means at right angles thereto, apparatus for distributing the books one at a time from the bottom of said hopper, transfer clamp means including jaws selectively operable to engage a single pile of books, means mounting said clamp means for selective ninety degree angular movement between said index means and said hopper, and controls responsive to the lowering of the stack in said hopper beyond a predetermined limit for producing cyclic operation of said clamp means to transfer a pile of material from said index means to said hopper.

References Cited in the file of this patent

UNITED STATES PATENTS

| | | |
|---|---|---|
| 1,365,741 | Speer | Jan. 18, 1921 |
| 2,089,918 | Paxton et al. | Aug. 10, 1937 |
| 2,333,479 | Graf | Nov. 2, 1943 |
| 2,341,705 | Fedorchak | Feb. 15, 1944 |
| 2,598,222 | Cahners et al. | May 27, 1952 |
| 2,605,910 | Kovatch | Aug. 5, 1952 |
| 2,641,321 | Cruzan | June 9, 1953 |
| 2,698,693 | Nordquist | Jan. 4, 1955 |
| 2,792,950 | Fenton et al. | May 21, 1957 |
| 2,807,390 | Bonebrake | Sept. 24, 1957 |
| 2,844,263 | Dreyer | July 22, 1958 |

FOREIGN PATENTS

| | | |
|---|---|---|
| 454,859 | Canada | Mar. 1, 1949 |